(12) United States Patent
Pasini et al.

(10) Patent No.: US 9,954,721 B2
(45) Date of Patent: Apr. 24, 2018

(54) METHOD AND SYSTEM FOR CONTROLLING FLOW OF NOTIFICATIONS WITHIN A TELECOMMUNICATIONS NETWORK

(75) Inventors: Federico Pasini, Cogoleto (IT); Maurizio Pighetti, Genoa (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 812 days.

(21) Appl. No.: 14/383,095

(22) PCT Filed: Mar. 27, 2012

(86) PCT No.: PCT/EP2012/055415
§ 371 (c)(1),
(2), (4) Date: Dec. 12, 2014

(87) PCT Pub. No.: WO2013/131585
PCT Pub. Date: Sep. 12, 2013

(65) Prior Publication Data
US 2015/0098336 A1 Apr. 9, 2015

(30) Foreign Application Priority Data
Mar. 6, 2012 (EP) .................................... 12158193

(51) Int. Cl.
*H04L 12/24* (2006.01)
*H04L 12/26* (2006.01)
*H04L 12/851* (2013.01)

(52) U.S. Cl.
CPC ...... *H04L 41/0627* (2013.01); *H04L 41/0213* (2013.01); *H04L 41/0681* (2013.01);
(Continued)

(58) Field of Classification Search
CPC . H04L 47/24; H04L 41/0627; H04L 41/0896; H04L 43/16; H04L 41/0681; H04L 41/0213
See application file for complete search history.

(56) References Cited

U.S. PATENT DOCUMENTS

| 6,791,998 B1 * | 9/2004 | Yoshihara | H04L 12/403 370/229 |
| 6,909,692 B1 * | 6/2005 | Sharma | H04L 41/0613 340/3.5 |

(Continued)

FOREIGN PATENT DOCUMENTS

| CN | 1163524 A | 10/1997 |
| CN | 1536827 A | 10/2004 |

(Continued)

OTHER PUBLICATIONS

Woundy, R. et al. "Cable Device Management Information Base for Data-Over-Cable Service Interface Specification (DOCSIS) Compliant Cable Modems and Cable Modem Termination Systems" Network Working Group, RFC 4639, Dec. 2006, The IEFT Trust, pp. 1-88.

(Continued)

*Primary Examiner* — Hassan Kizou
*Assistant Examiner* — Abdullahi Ahmed
(74) *Attorney, Agent, or Firm* — Sage Patent Group

(57) ABSTRACT

A telecommunications network arranged for controlling the flow of SNMP trap notifications from Subtended Network Elements and subtending Gateway Network Elements to a Management System, the network being provided with a Network Analyzer arranged for determining the number of Network Elements that are subtended by each Gateway Network Element, and a Notification Threshold Manager arranged for calculating a Notification Throttling Threshold (an upper limit for the rate at which a Subtended Network (Continued)

Element may send SNMP trap notifications to the Management System in dependence upon the number of Network Elements that are subtended by the Gateway Network Element. The Notification Throttling Threshold is transmitted to the Gateway Network Element and Subtended Network Elements by the Management System. Also disclosed is a method for controlling the flow of SNMP trap notifications in the above-described network.

18 Claims, 7 Drawing Sheets

(52) U.S. Cl.
CPC .......... *H04L 41/0896* (2013.01); *H04L 43/16* (2013.01); *H04L 47/24* (2013.01)

(56) References Cited

U.S. PATENT DOCUMENTS

| | | | |
|---|---|---|---|
| 8,949,414 B2* | 2/2015 | Raja | ...................... H04L 43/028 709/223 |
| 2002/0112040 A1* | 8/2002 | Chang | ................. H04L 41/5035 709/223 |
| 2011/0264784 A1 | 10/2011 | Power et al. | |

FOREIGN PATENT DOCUMENTS

| | | |
|---|---|---|
| CN | 101360313 A | 2/2009 |
| EP | 2 151 948 A1 | 2/2010 |
| EP | 2151948 A1 | 2/2010 |

OTHER PUBLICATIONS

International Standard ISO/IEC 8473-1 "Information Technology—Protocol for providing the connectionless-mode network service: Protocol specification" Second Edition, Nov. 1, 1998, pp. 1-64.
International Standard ISO/IEC 10589 "Information Technology—Telecommunications and information exchange between systems—Intermediate system to Intermediate system intra-domain routeing information exchange protocol for use in conjunction with the protocol for providing the connectionless-mode Network Service (ISO 8473)" First Edition, Apr. 30, 1992, pp. 1-155.
International Standard ISO/IEC 9542 "Information Technology—End system to intermediate system routeing information exchange protocol for use in conjunction with the protocol for providing the connectionless-mode network service (ISO/IEC 8473)", Second Edition, 1994, pp. 1-49.
ITU-T Recommendation Standard G.7712/Y.1703 "Architecture and Specification of data communication network" Sep. 2010, pp. 1-96.
Callon, R. "Use of OSI IS-IS for Routing in TCP/IP and Dual Environments" Network Working Group, RFC 1195, Dec. 1990, pp. 1-75.
PCT Search Report, dated Jul. 6, 2012, in connection with International Application No. PCT/EP2012/055415, all pages.
ITU-T Recommendation Q.811 (Feb. 2004), Series Q: Switching and Signalling, Q4 interface, Lower layer protocol profiles for the Q and X interfaces, 46 pages.
Chinese Office Action dated Sep. 13, 2016 in connection with Chinese Application No. 201280071179.9, all pages.
English language translation of Chinese Office Action dated Sep. 13, 2016 in connection with Chinese Application No. 201280071179.9, all pages.
English language text of First Office Action, in connection with Chinese Application No. 201280071179.9, all pages.
English language translation of Chinese Search Report dated Sep. 1, 2016, in connection with Chinese Application No. 201280071179.9, all pages.

* cited by examiner

METHOD AND SYSTEM FOR CONTROLLING FLOW OF NOTIFICATIONS WITHIN A TELECOMMUNICATIONS NETWORK

CROSS-REFERENCE TO RELATED APPLICATIONS

This application claims priority under 35 U.S.C. §119 to European Patent Application No. 12158193.8, filed Mar. 6, 2012, which is hereby incorporated herein by reference in its entirety.

TECHNICAL FIELD

The present invention relates to a system for controlling the flow of notifications within a Data Communication Network (DCN), and particularly but not exclusively a system for setting throttling thresholds for individual Network Elements (NEs) within a DCN network.

BACKGROUND

A typical DCN comprises an Operational Support System (OSS) arranged for managing a plurality of Gateway Network Elements (Gateway NEs), each Gateway Network being arranged for subtending a number of Network Elements (subtended NEs). In this respect, the subtended Network Elements are arranged at a lower hierarchical networked level than the respective Gateway Network Element, such that the subtended Network Elements are interconnected to the DCN via an Ethernet Interface (Gateway NE). The network elements may also be connected via embedded channels inside the traffic lines such as Synchronous Transmission Module-n (STM-n) for Synchronous Digital Hierarchy (SDH) or optical channels for Dense Wavelength Divisional Multiplexing (DWDM). These embedded channels are called, depending from the kind of frame overhead they use, Data Communications Channels (DCCs), Optical Supervisory Channels (OSCs), General Communications Channels (GCCs), and others.

For protection purpose, several DCC channels can be activated between nodes flowing same or separated optical links, and the routing algorithm metrics will allow the proper routing path selection. The same configuration policy is used for DWDM, which deploys OSC for the embedded channels, and for Ethernet links, where a specific Virtual Local Area Network (VLAN) tag is used to carry management data.

If functioning under normal operating conditions, the Network Element management from the OSS ensures that the network is able respond at nearly real-time to a given task. If, however, there is a problem with a Network Element, then the Network Element will send an alarm trap notification to the OSS to notify the OSS of the problem. The capability of the Operational Support System (OSS) to receive alarm traps from the managed Network Elements is a key feature in the monitoring of the network. It allows the operator to take the appropriate actions required to ensure optimal network performance and preserve business. In the event of a high alarm condition, a Network Element or a plurality of Network Elements may send a large number of alarm traps to the Operational Support System.

It will be appreciated that the Operational Support System is only capable of processing alarm trap notifications at a certain rate, and that the Operational Support System will be overloaded if the actual rate of alarm trap notifications exceeds this maximum rate (so-called "Trap Storms"). Accordingly, it is desirable to limit the rate at which alarm traps are sent.

In order to limit the rate at which alarm traps are sent, it is known to allocate a Notification Throttling Threshold to each Network Element. It will be appreciated that if the Throttling Threshold is set too high then an alarm burst may occur, this alarm burst potentially exceeding the capacity of the receiving Network Manager and this incapacitating the network. If, however, the threshold is set too low then it can cause the Network Element to unnecessarily cease its transmission of alarm trap notifications.

One existing technology for limiting the rate at which alarm traps are sent is based on a notification throttling mechanism that enables a customer to allocate a Throttling Threshold to each Network Element. The Throttling Threshold may be based on the Network Element's software and hardware features. The throttling mechanism discards any alarm traps that exceed the customer configurable threshold and the Management System of the OSS polls the Network Element to discover any lost alarms from the alarm log (a so-called "trap recovery mechanism"). One problem with this existing technology is that, in the case of a connectionless algorithm (e.g. SNMP) the trap recovery mechanism will be activated as soon as the next notifications are received causing an unnecessary network overload due to alarm realignment. Another problem is that Network Elements are treated as stand-along elements and their role within the network is not considered. In particular, the problem of a communication bottleneck at the Gateway Network Element is not addressed. In particular, a customer may set the Notification Throttling Threshold for a Network Element appropriately for a given network configuration, but if the configuration of the network is subsequently changed (e.g. a Network Element may go offline) then the previously set Throttling Threshold is no longer suitable.

SUMMARY

It is an object of the present invention to automatically adjust the Throttling Thresholds of the Network Elements in accordance with the current configuration of the network i.e. to calculate the optimal Throttling Threshold of a Network Element based on the network topology as opposed to considering each Network Element as a standalone element.

In accordance with the present invention as seen from a first aspect, there is provided a method for assigning Notification Throttling Thresholds within a telecommunications network. The telecommunications network comprises a Management System in communicative contact a Gateway Network Element. Said Gateway Network Element being arranged for subtending Network Elements, and the Gateway Network Element and the subtended Network Elements being arranged for sending notifications to said Management System. The method comprises step a) of determining the number of Network Elements that are subtended by the Gateway Network Element. In a following step b) a Notification Throttling Threshold is calculated in dependence upon the number of Network Elements that are subtended by the Gateway Network Element. The method further comprises step c) of assigning the Notification Throttling Threshold to the subtended Network Elements.

Preferably the Notification Throttling Threshold in step b) is defined as an upper limit for the rate at which a subtended Network Element may send notifications to the Management System without overloading the Gateway Network Element.

The notifications are may be sent autonomously from the Gateway Network Element or subtended Network Element in the event of a change of state (COS) of said Network Element i.e. without polling of the Network Element. The notifications may, for example, comprise Simple Network Management Protocol (SNMP) traps.

It will be appreciated that alarm trap notifications from the subtended Network Elements are routed through the associated Gateway Network Elements and thus a communications bottleneck exists at the Gateway Network Elements. In particular, if a plurality of subtended Network Elements are under alarm conditions concurrently and these Network Elements are all subtended by the same Gateway NE, then a bottleneck will exist at this Gateway Network Element. Accordingly, one advantage of the present invention is that the Notification Throttling Threshold of each subtended Network Element is calculated in dependence upon the load of the subtending Gateway Network Element at that time. This method ensures that the Throttling Threshold for each Network Element is calculated in dependence upon the network as a whole but avoids setting the Throttling Threshold unnecessarily low (as would be the case under the unrealistic assumption that all managed Network Elements may be under alarm conditions simultaneously and that the threshold should be calculated based on the capacity of the Management System of the OSS).

The steps a) to c) may be repeated in the event that a change in the number of Network Elements that are subtended by the Gateway Network Element is detected. In this way, the Notification Throttling Threshold is always appropriate for the current state of the network.

In one embodiment, step b) can comprise the intermediary steps of:
  i. determining the routing capacity of the Gateway Network Element;
  ii. scaling the routing capacity of the Gateway Network Element by a factor corresponding to the fraction of the total routing capacity allocated to the transmission of notifications;
  iii. dividing the scaled routing capacity of the Gateway Network Element by the total number of Network Elements subtended from the Gateway Network Element to give the Notification Throttling Threshold.

One advantage of this method is that the rate at which alarm rate notifications are routed through the Gateway Network Element is never allowed to exceed the fraction of the total routing capacity of that Gateway Network Element that has been allocated to the transmission of notifications. As such, all Gateway Network Elements in the network will always have sufficient routing capacity to transmit other signals from the Management System of the OSS to the managed Network Elements and vice versa: the routing capacity of the Gateway Network Element is fully exploited but not overloaded. Accordingly, the majority of the network can continue under usual operating conditions even if certain Network Elements are under alarm conditions.

In an alternative possible embodiment, step b) comprises the steps of:
  i. determining the routing capacity of the Gateway Network Element;
  ii. scaling the routing capacity of the Gateway Network Element by a factor corresponding to the fraction of the total routing capacity allocated to the transmission of notifications;
  iii. dividing the scaled routing capacity of the Gateway Network Element by a number comprising the combined number of Network Elements subtended from the Gateway Network Element including the Gateway Network Element, to give the Notification Throttling Threshold for each Network Element.

This preferred embodiment recognises the possibility that the Gateway Network Element itself may be under an alarm condition and may therefore send alarm trap notifications to the Management System of the OSS. Notifications sent from the Gateway Network Element itself also contribute to the total rate of notifications that are routed via the Gateway Network Element.

The factor, which may be pre-allocated, corresponding to the fraction of the total routing capacity allocated to the transmission of notifications could be user-programmable, thereby enabling a user to customise the Notification Throttling Threshold of each of the Network Elements in accordance with their specific requirements.

Given that it is possible to calculate the Notification Threshold in dependence upon the total routing capacity of the Gateway Network Element, at least step b) and step c) can be repeated in the event that a change in the routing capacity of the Gateway Network Element is detected.

Whilst the above-described method is capable of allocating appropriate Notification Throttling Thresholds to each Network Element subtended by a Gateway Network Element when there is only one Gateway Network Element in the network, the method is particularly useful if the network comprises at least two Gateway Network Elements. In this case, steps a) to c) are may be carried out for each Gateway Network Element. It will be appreciated that this enables Network Elements that are subtended by different Gateway Network Elements to be provided with different Notification Throttling Thresholds, each Notification Throttling Threshold being appropriate to the routing capacity of the Gateway Network Element and the number of Network Elements that are subtended by the Gateway Network Element.

It will be appreciated that the purpose of assigning Notification Throttling Thresholds to the managed Network Elements (Gateway Network Elements and Network Elements subtended thereby) is to ensure that the network is not overloaded in the event of an alarm condition in one or more of the managed Network Elements. As such, the method may further comprise the steps of:
  d) Monitoring the rate of transmission of notifications from the Gateway Network Element and subtended Network Elements; and,
  e) At least partially ceasing transmission of notifications from a Gateway Network Element or subtended Network Element in the event that rate of transmission of notifications from said Network Element exceeds the Notification Throttling Threshold assigned to said Network Element.

Also in accordance with the present invention, as seen from a second aspect, there is provided a telecommunications network arranged for controlling a flow of notifications therein. Said telecommunications network comprises a Gateway Network Element arranged for subtending Network Elements, a Management System, a Network Analyser and a Notification Threshold Manager, The Network Analyser is arranged for determining the number of Network Elements that are subtended by the Gateway Network Element. The Notification Threshold Manager is in communicative contact with the Network Analyser and is arranged for calculating a Notification Throttling Threshold in dependence upon the number of Network Elements that are subtended by the Gateway Network Element. The Management System is in communicative contact said Notification Threshold Manager and said Gateway Network Element, and is arranged for transmitting said Notification Throttling Threshold to said Gateway Network Element and Subtended Network Elements.

Preferably, the Notification Throttling Threshold is defined as an upper limit for the rate at which a Subtended Network Element may send notifications to the Management System without overloading the Gateway Network Element.

In the above-described network, the Management System may comprise a Network Manager such as an Optical Network Element Manager (ON-EM). In a preferred embodiment, the notifications are sent autonomously from the Gateway Network Element or a subtended Network Element in the event of a change of state (COS) of said Network Element. Such notifications may, for example, comprise Simple Network Management Protocol (SNMP) traps.

Whilst the above-described network is capable of allocating appropriate Notification Throttling Thresholds to each Network Element subtended by a Gateway Network Element when there is only one Gateway Network Element in the network, the method is particularly useful if the network comprises at least two Gateway Network Elements. In this case, the Network Analyser can be arranged for determining the number of Network Elements subtended by each Gateway Network Element, the Notification Threshold Manager can be arranged for calculating a Notification Throttling Threshold for each Gateway Network Element, and the Management System can be arranged for transmitting a Notification Throttling Threshold for a given Gateway Network Element to said given Gateway Network Element and Network Elements subtended by said given Gateway Network Element. It will be appreciated that this enables Network Elements that are subtended by different Gateway Network Elements to be provided with different Notification Throttling Thresholds, each Notification Throttling Threshold being appropriate to the routing capacity of the Gateway Network Element and the number of Network Elements that are subtended by the Gateway Network Element.

BRIEF DESCRIPTION OF THE DRAWINGS

An embodiment of the present invention will now be described by way of example only and with reference to the accompanying drawings, in which.

DETAILED DESCRIPTION

Figure 1:
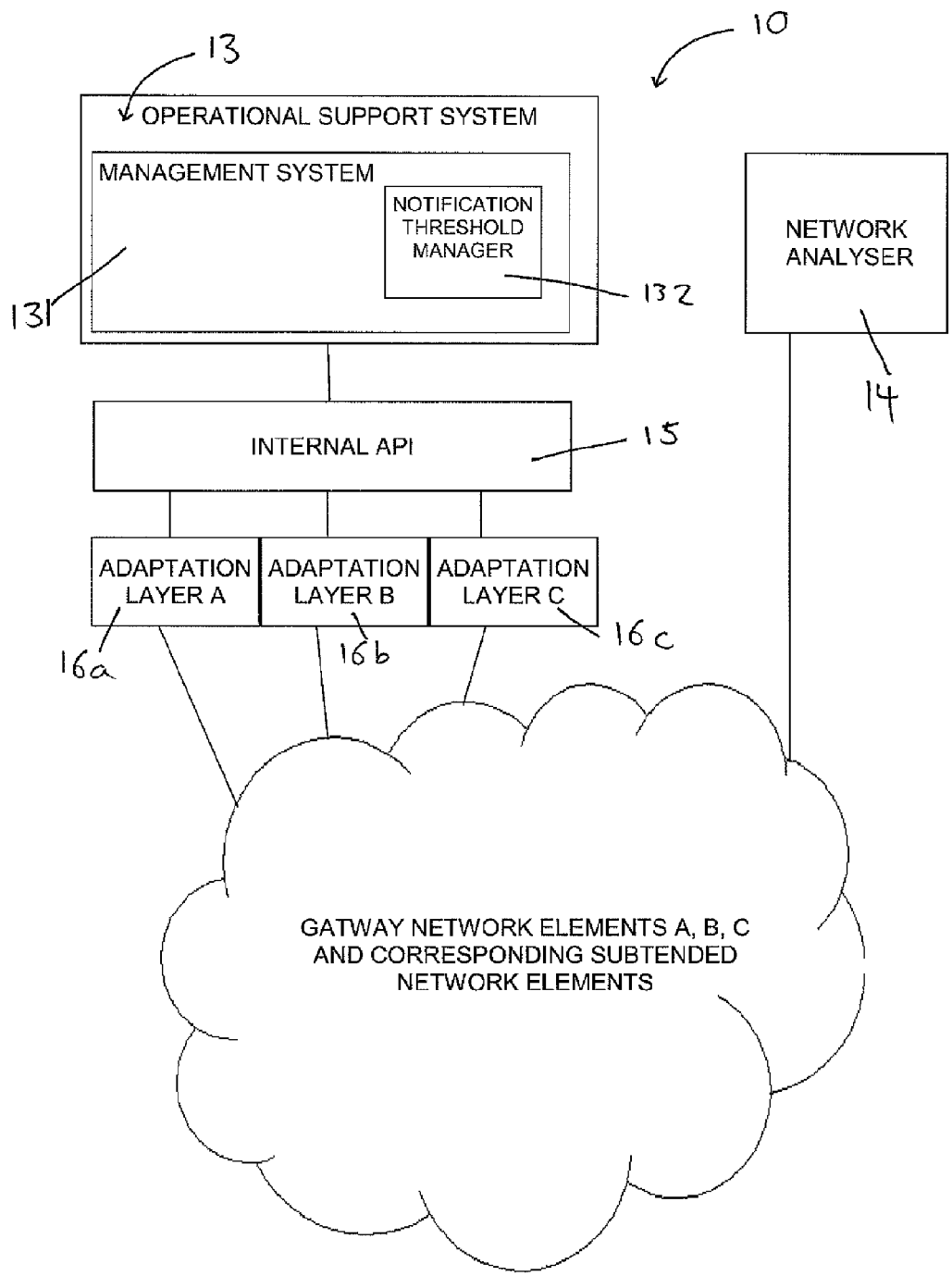
FIG. 1 is an architectural view of a Data Communications Network in accordance with the second aspect of present invention.
Figure 2:
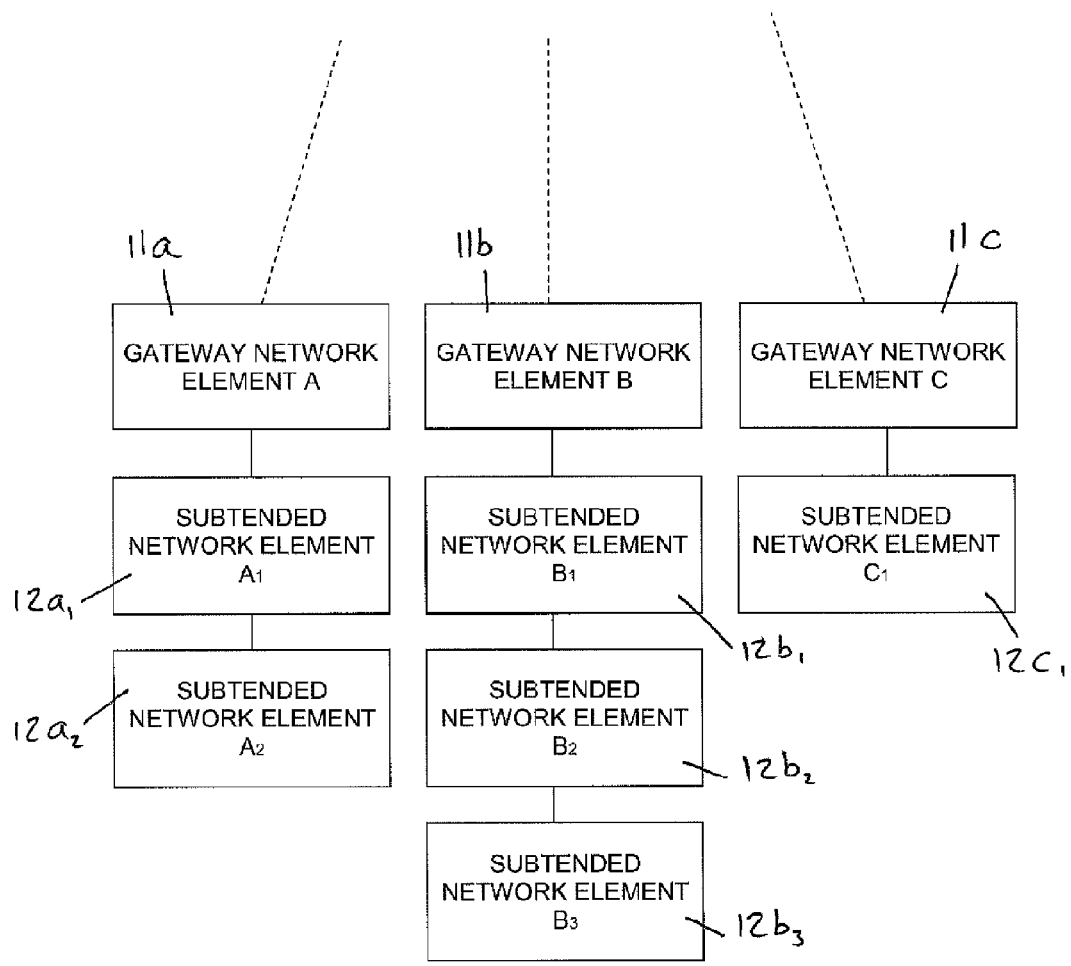
FIG. 2 is a schematic illustration of a possible configuration of Gateway Network Elements and Subtended Network Elements of the network of FIG. 1.
Figure 3:
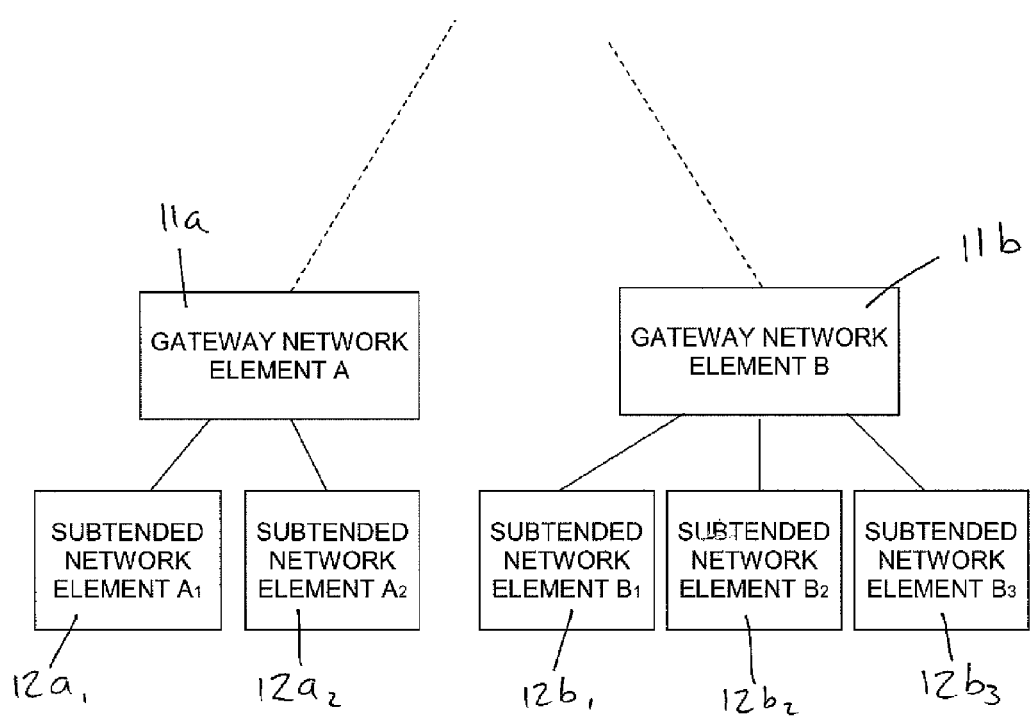
FIG. 3 is a schematic illustration of a second possible configuration of Gateway Network Elements and Subtended Network Elements of the network of FIG. 1.
Figure 4:
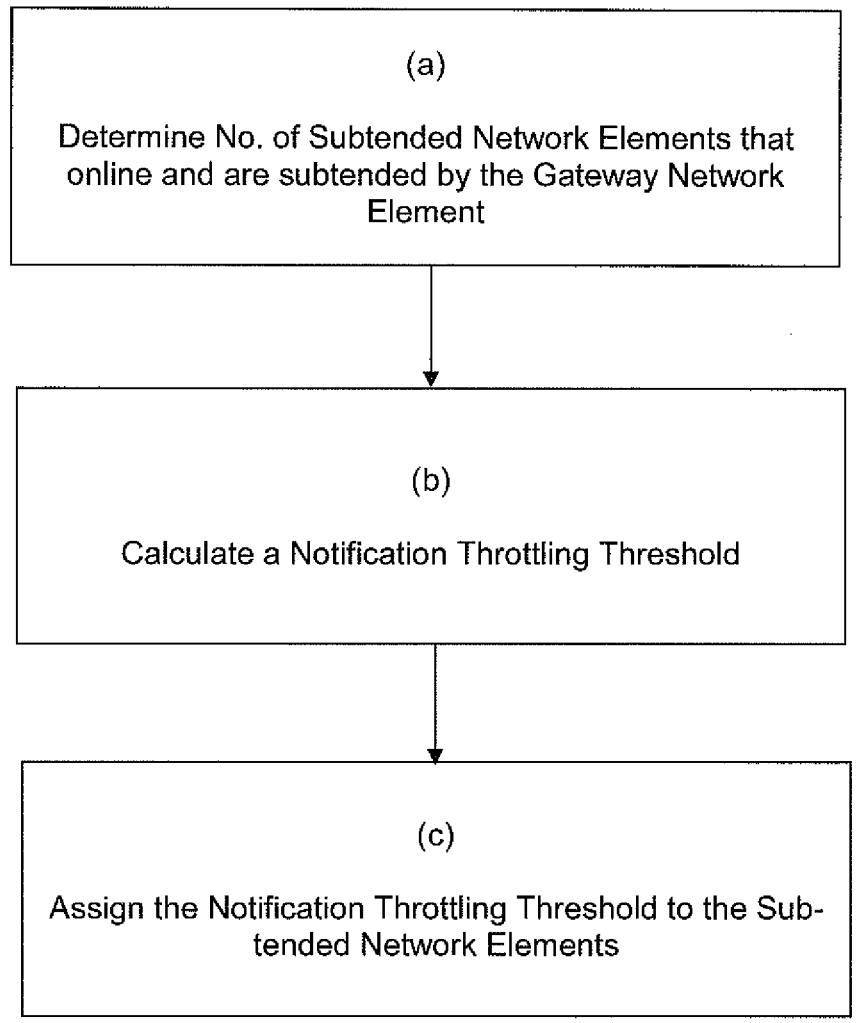
FIG. 4 is a flow diagram illustrating a method for assigning Notification Throttling Thresholds within the network of FIG. 1, in accordance with the first aspect of the present invention.

With reference to FIGS. 1 to 3 of the drawings, there is provided a telecommunications network 10 arranged for controlling the flow of notifications therein. The telecommunications network 10 is provided with three Gateway Network Elements 11 in communicative contact with an Operational Support System 13 via an internal Application Programming Interface (API) 15 and adaption layer 16 for each Gateway Network Element.

The Gateway Network Elements 11 are arranged for subtending Network Elements 12. In this respect, the Network Elements 12 are arranged at a lower hierarchical networked level than the respective Gateway Network Element 11, such that the Network Elements 12 are required to route network traffic through the respective Gateway Network Element 11 to communicate with the Operational Support System 13. In the arrangement shown in FIG. 2 for example, Gateway Network Element A 11a is arranged for subtending Network Elements $12a_1$ and $12a_2$ arranged in a star configuration, Gateway Network Element B 11b is arranged for subtending Network Elements $12b_1$, $12b_2$ and $12b_3$ arranged in a daisy-chain configuration, and Gateway Network Element C 11c is arranged for subtending Network Element $12c_1$. In the arrangement shown in FIG. 3 (where like parts are given like reference numerals), Gateway Network Element A 11a is arranged for subtending Network Elements $12a_1$ and $12a_2$ arranged in a star configuration, Gateway Network Element B 11b is arranged for subtending Network Elements $12b_1$, $12b_2$ and $12b_3$ arranged in a star configuration.

The Operational Support System 13 comprises a Management System 131 and a Notification Threshold Manager 132, the Notification Threshold Manager 132 forming part of the Management System 131, as illustrated in FIG. 1. The Notification Threshold Manager 132 is a novel software module adapted for running on a Network Manager 131 such as an Optical Network Element Manager (ON-EM). Another component of the network 10 is a Network Analyser 14 (DCN-ANA), arranged for analysing the topology of the network 10 and in particular for determining the number of Network Elements 12 that are subtended by each of the Gateway Network Elements 11.

The Notification Threshold Manager 132 is in communicative contact with the Network Analyser 14 and is arranged for acquiring from the Network Analyser 14 a list of Network Elements 11, 12 associated with each Gateway Network Element 11. The Notification Threshold Manager 132 is further arranged for determining the routing capacity of each Gateway Network Element 11 in the network 10. This may be achieved by polling the Management System 131, the Management System 131 either being arranged for measuring the routing capacity of each Gateway Network Element 11 or storing a user-programmed value for the routing capacity of each Gateway Network Element 11. The Notification Threshold Manager 132 is also provided with a factor, which may be pre-allocated, corresponding to the fraction of the total routing capacity allocated to the transmission of notifications for each Gateway Network Element 11. These pre-allocated factors may be stored in a memory of the Management System 121 and requested by the Notification Threshold Manager 132. It is envisaged that each Gateway Network Element 11 will have its own pre-allocated factor, but it is also possible that a single pre-allocated factor is applicable to all Gateway Network Elements 11. It is also possible, in alternative embodiments, that the factor is manually entered by a network operator/ administrator. Once the Network Analyser 14 has received the list of Network Elements 11, 12 associated with each Gateway Network Element 11 and information relating to the routing capacity and pre-allocated factor of each Gateway Network Element 11, it is arranged for calculating a Notification Throttling Threshold for each Gateway Network Element 11. In a preferred embodiment the Notification Throttling Threshold is defined as an upper limit for the rate at which a Subtended Network Element 12 may send notifications to the Management System 131 without overloading the subtending Gateway Network Element 12. The Notification Throttling Threshold is calculated by initially scaling the total routing capacity of the Gateway Network Element 11 by the pre-allocated factor corresponding to the fraction of the total routing capacity allocated to the transmission of notifications. The scaled routing capacity is then divided by the total number of Network Elements 12 subtended by the Gateway Network Element 11 to give a Notification Throttling Threshold for each subtended Network Element 12. Alternatively, the scaled routing capacity is divided by the total number of Network Elements (including the Gateway Network Element 11 and all of the Network Elements 12 subtended thereby) to give a Notification Throttling Threshold for each subtended Network Element 12. For example, if the total routing capacity of Gateway Network Element B 11b is 20 million packets per second (pps) and the pre-allocated factor is 0.1 then the scaled routing capacity for Gateway Network Element B 11b is 2 million pps, and the Notification Throttling Threshold for each of the Network Elements $12b_1$, $12b_2$ and $12b_3$ subtended by the same Gateway Network Element 11b is 500,000 pps.

In an alternative embodiment the Notification Throttling Threshold is defined as percentage of the upper limit for the rate at which a Subtended Network Element 12 may send notifications to the Management System 131 without overloading the subtending Gateway Network Element 12. This alternative embodiment allows for implementing a hysteresis, which, in turn, reduces the frequency of updating the value of the Notification Throttling Threshold.

The Management System 131 is in communicative contact the Notification Threshold Manager 132 and the Gateway Network Elements 11. This enables the Management System 131 to retrieve the Notification Throttling Thresholds from the Notification Threshold Manager 132 and transmit each Notification Throttling Threshold to the appropriate Gateway Network Element 11 and/or subtended Network Element 12.

In use, if a Network Element 11, 12 is not functioning correctly i.e. is in an alarm condition then the Network Element 11, 12 will autonomously send a Simple Network Management Protocol (SNMP) trap to the Management System 131. The trap alerts the Management System to the problem 131 and the Management System 131 may take appropriate action. It will be appreciated that in the absence of the present invention, a communications bottleneck could occur at the Gateway Network Element 11, which is likely to be detrimental to the functioning of the network 10.

If there is a change in any of the input variables in the calculation of the Notification Throttling Threshold then the Notification Threshold Manager 132 is adapted for automatically recalculating the Notification Throttling Threshold for any affected Network Elements 11, 12. Possible causes of a change in the input variables are described below, along with an example mechanism by which the Notification Throttling Thresholds are calculated:

CAUSE: A change in the operational status of a Network Element 11, 12 (for example a Network Element 11 goes offline due to planned maintenance or unexpected failure). In this case, the total number of Network Elements is altered.

MECHANISM:
1. The adaptation layers 16 capture the link down of the NE(s), according to the specific technology;
2. The information is forwarded to the Management System 131;
3. The Management System 131 notifies the information to Notification Threshold Manager 132;
4. The Notification Threshold Manager 132 retrieves the configuration of the network from the Network Analyser 14;
5. The Notification Threshold Manager 132 calculates the Notification Throttling Threshold for each Network Element 11, 12 involved in the sub-network(s) related to the offline Network Element 11;
6. The Notification Threshold Manager 132 notifies the new Notification Throttling Thresholds to the Management System 131;
7. The Management System 131 sends the throttling thresholds to the adaptation layers of each Network Element 11, 12

CAUSE: A change in the DCN topology (for example a Network Element is added). Again, the total number of Network Elements is altered in this case.

MECHANISM:
1. The adaptation layers 16 capture the link down of the NE(s), according to the specific technology;
2. The information is forwarded to the Management System 131;
3. The Management System 131 notifies the information to Notification Threshold Manager 132;
4. The Notification Threshold Manager 132 retrieves the configuration of the network from the Network Analyser 14;
5. The Notification Threshold Manager 132 calculates the Notification Throttling Threshold for the new Network Element 11 and for each Network Element 11, 12 involved in the related sub-network;
6. The Notification Threshold Manager 132 notifies the new Notification Throttling Thresholds to the Management System 131;
7. The Management System 131 sends the throttling thresholds to the adaptation layers of each Network Element 11, 12

Other possible causes of a change in the input variables include, but are not limited to:
A change in the routing capacity of the Gateway Network Element 11 due to a change in the DCN topology.
A change in the routing capacity of the Gateway Network Element 11 due to a switch in the DCN protection path.

With reference to FIGS. 4 to 7 of the drawings, there is provided a method 100 for assigning Notification Throttling Thresholds within the above-described telecommunications network 10. The method comprises the steps of:

(a) determining the number of Network Elements 12 that are subtended by each Gateway Network Element 11;
(b) calculating a Notification Throttling Threshold for each Gateway Network Element 11 in dependence upon the number of Network Elements 12 that are subtended by said Gateway Network Element; and,
(c) assigning the Notification Throttling Threshold to the Network Elements 12 subtended by said Gateway Network Element 11.

The notifications associated with the Notification Throttling Threshold are Simple Network Management Protocol (SNMP) traps sent autonomously from the Gateway Network Element 11 or Subtended Network Element 12 (via the associated Gateway Network Element 11) in the event of a change of state (COS) of the Network Element i.e. without polling of the Network Element 11, 12.

It will be appreciated that, in accordance with this method, the Network Elements 12 subtended by a given Gateway Network Element 11 will all be assigned the same Notification Throttling Threshold. The Gateway Network Element 11 itself may also be assigned this same Notification Throttling Threshold.

This method ensures that the Throttling Threshold for each Network Element 11, 12 is calculated in dependence upon the network as a whole. The method has been developed in recognition of the fact that a communications bottleneck is likely to occur at a Gateway Network Element 11 that is subtending a plurality of Network Elements 12 that are under alarm conditions. Advantageously, the method ensures that only a pre-allocated proportion of the routing capacity of the Gateway Network Element 11 is ever allocated to the transmission of Simple Network Management Protocol (SNMP) trap notifications, and thus the network 10 is able to operate effectively even when certain Network Elements 11, 12 are under alarm conditions (i.e. are transmitting or attempting to transmit SNMP trap notifications to the Management System 131).

The method is particularly valuable if the network 10 comprises at least two Gateway Network Elements 11 (e.g. 11a, 11b and 11c). In this case, steps a) to c) are carried out for each Gateway Network Element 11a, 11b and 11c and associated Network Elements 12a, 12b, 12c subtended thereby. It will be appreciated that this enables Network Elements 12 that are subtended by different Gateway Network Elements 11 to be provided with different Notification Throttling Thresholds, each Notification Throttling Threshold being appropriate to the routing capacity of the Gateway Network Element 11 and the number of Network Elements 11, 12 that are subtended by the Gateway Network Element 11.

It is possible that the number of Network Elements 12 that are subtended by a given Gateway Network Element 11 is changed. This change may occur because a subtended Network Element 12 goes offline, or a new subtended Network Element 12 is added etc. In the event that a change in the number of Network Elements 12 subtended by a Gateway Network Element 11 is detected (e.g. by the Network Analyser 14), the Notification Throttling Threshold for each of the affected Network Elements 11, 12 is automatically recalculated. Recalculation is achieved by the repetition of steps a) to c) for each of the affected Network Elements 11, 12. A given Network Element 11, 12 is "affected" if it is within the sub-network in which the number of subtended Network Elements 12 is altered. Considering Gateway Network Element A 11a shown in FIGS. 2 and 3 by way of example: if Subtended Network Element $A_2$ $12a_2$ goes offline then the Notification Throttling Threshold for subtended Network Element $A_1$ $12a_1$ and Gateway Network Element A 11a is automatically recalculated and assigned. In this way, the Notification Throttling Threshold is always appropriate for the current state of the network 10.

Figure 5:
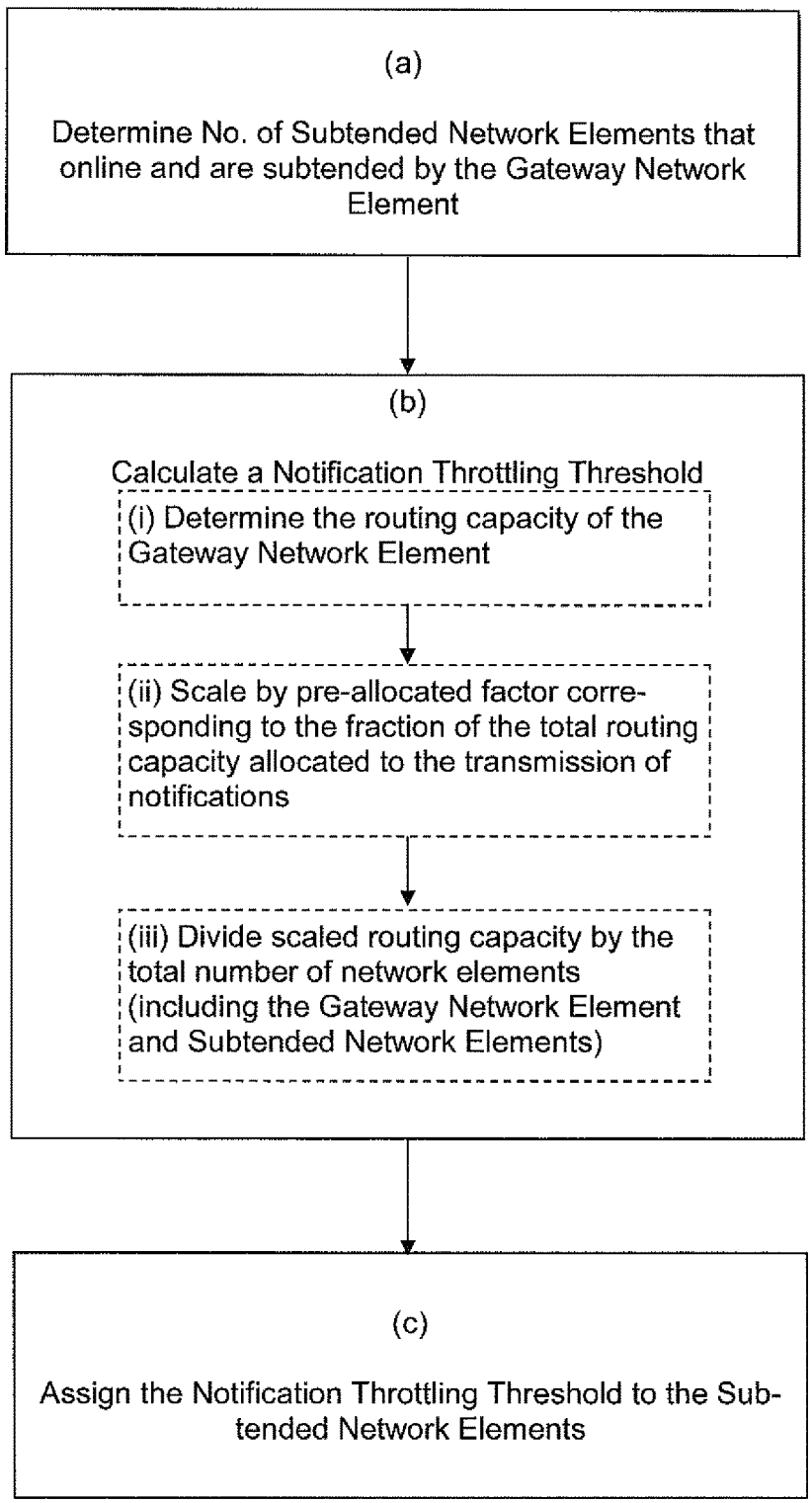
FIG. 5 is a flow diagram of the method of FIG. 4 comprising intermediate steps in accordance with a first embodiment of the present invention.

Referring to the embodiment shown in FIG. 5 of the drawings, the step of calculating a Notification Throttling Threshold for each Gateway Network Element 11 (step b)) comprises the steps of i. determining the routing capacity of the Gateway Network Element 11;
ii. scaling the routing capacity of the Gateway Network Element 11 by a factor corresponding to the fraction of the total routing capacity allocated to the transmission of notifications;
iii. dividing the scaled routing capacity of the Gateway Network Element 11 by the total number of Network Elements 12 subtended from the Gateway Network Element 11 to give the Notification Throttling Threshold The factor, which may be pre-allocated, corresponding to the fraction of the total routing capacity allocated to the transmission of notifications is user-programmable, thereby enabling a user to customise the Notification Throttling Threshold of each of the Network Elements 11, 12 in accordance with their specific requirements.

Considering sub-network A (Gateway Network Element A 12a and Network Elements $A_1$ $12a_1$ and $A_2$ $12a_2$ subtended thereby) by way of example: the number of Network Elements 12a subtended by Gateway Network Element A 12a is found to be two in step a). The routing capacity of Gateway Network Element A 12a is determined in step b)(i) e.g. 20 million pps. This is scaled by a pre-allocated factor e.g. 0.1 to give the total routing capacity allocated to the transmission of notifications (e.g. 2 million) in step b)(ii), and divided by the total number of Subtended Network Elements 12a (2) in step b)(iii) to give a Notification Throttling Threshold for sub-network A of 1 million pps. This Notification Throttling Threshold is then allocated to the subtended Network Elements $A_1$ $12a_1$ and $A_2$ $12a_2$ in step c).

One advantage of this method is that the rate at which alarm rate notifications are routed through the Gateway Network Element 11 is never allowed to exceed the fraction of the total routing capacity of that Gateway Network Element 11 that has been allocated to the transmission of notifications. As such, all Gateway Network Elements 11 in the network 10 will always have sufficient routing capacity to transmit other signals from the Management System 131 of the OSS 13 to the managed Network Elements 11, 12 and vice versa: the routing capacity of the Gateway Network Element 11 is fully exploited but not overloaded. Accordingly, the majority of the network 10 can continue under usual operating conditions even if certain Network Elements 11, 12 are under alarm conditions.

Given that the Notification Threshold is calculated in dependence upon the total routing capacity of the Gateway Network Element 11, steps b) and c) are repeated in the event that a change in the routing capacity of the Gateway Network Element 11 is detected. Such a change may be caused, for example, by a change in the DCN topology or a switch in the DCN protection path.

Figure 6:
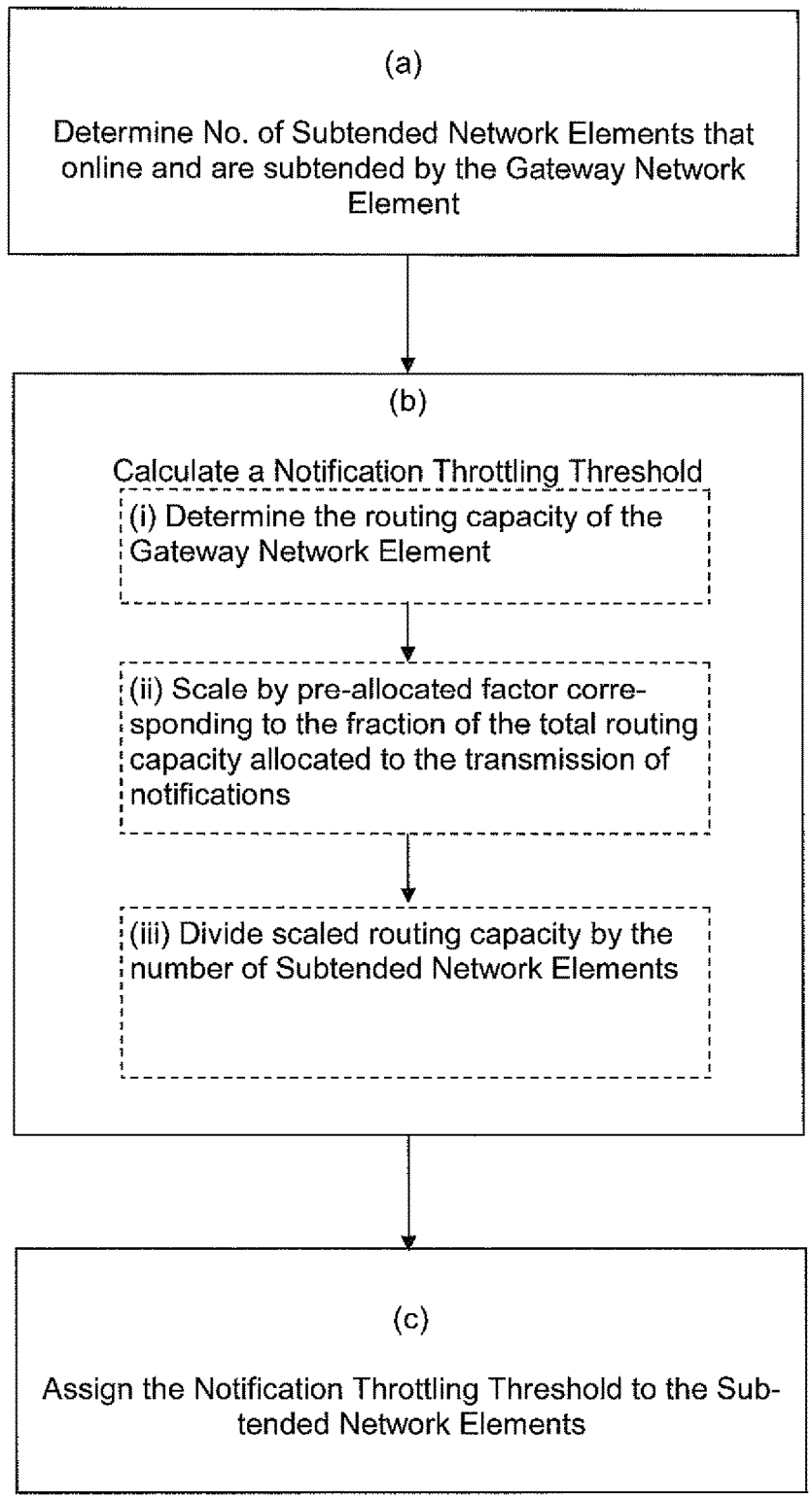
FIG. 6 is a flow diagram of the method of FIG. 4 comprising alterative intermediate steps in accordance with a second embodiment of the present invention; and, FIG. 7 is a flow diagram of the method of FIG. 4 comprising further steps in accordance with a third embodiment of the present invention.

Referring to the embodiment shown in FIG. 6 of the drawings, the step of calculating a Notification Throttling Threshold for each Gateway Network Element (step b)) comprises the steps of i. determining the routing capacity of the Gateway Network Element 11;
ii. scaling the routing capacity of the Gateway Network Element 11 by a factor, which may be pre-allocated, corresponding to the fraction of the total routing capacity allocated to the transmission of notifications;
i. iii. dividing the scaled routing capacity of the Gateway Network Element 11 by a number comprising the combined number of Network Elements 12 subtended from the Gateway Network Element 11, including the Gateway Network Element 11, to give the Notification Throttling Threshold.

This embodiment differs from the embodiment shown in FIG. 5 in that it considers the possibility that the Gateway Network Element 11 itself may be under an alarm condition and may therefore send alarm trap notifications to the Management System 131 of the OSS 12. Notifications sent from the Gateway Network Element 11 itself also contribute to the total rate of notifications that are routed via the Gateway Network Element 11.

Figure 7:
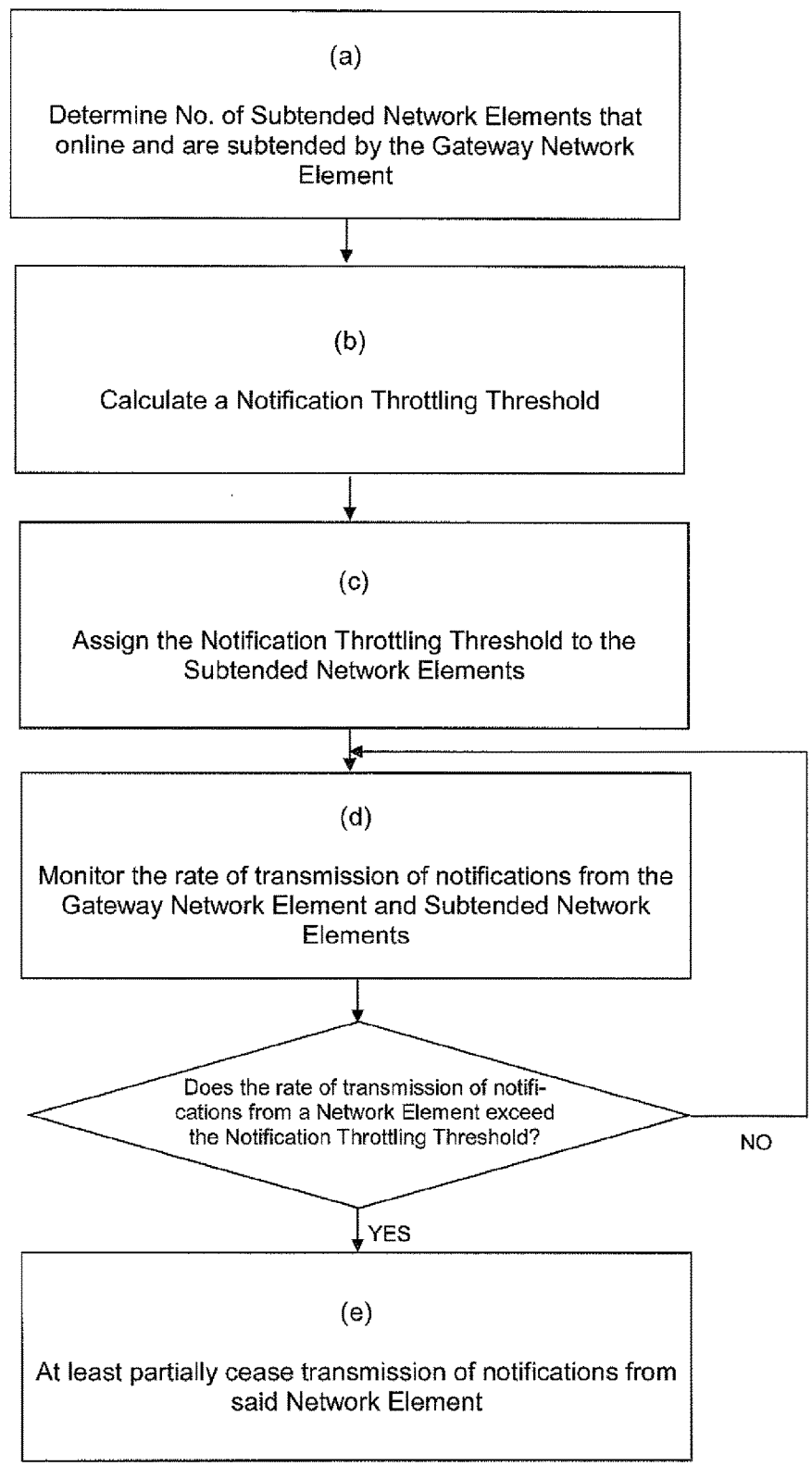

With particular reference to FIG. 7 of the drawings, it will be appreciated that the purpose of assigning Notification Throttling Thresholds to the managed Network Elements (Gateway Network Elements 11 and Network Elements 12 subtended thereby) is to ensure that the network 10 is not overloaded in the event of an alarm condition in one or more of the managed Network Elements 11, 12. The method may therefore be extended to include the steps of:

d) Monitoring the rate of transmission of notifications from the Gateway Network Element 11 and subtended Network Elements 12; and, e) At least partially ceasing transmission of notifications from a Gateway Network Element 11 or subtended Network Element 12 in the event that rate of transmission of notifications from said Network Element 11, 12 exceeds the Notification Throttling Threshold assigned to said Network Element 11, 12.

From the foregoing therefore, it is evident that the present invention provides a simple yet effective means of ensuring that the routing capacity of each Gateway Network Element 11 is always used to its full capacity but not overloaded.

The invention claimed is:

1. A method for assigning Notification Throttling Thresholds within a telecommunications network, said telecommunications network comprising a Management System in communicative contact with a Gateway Network Element, said Gateway Network Element being arranged for subtending Network Elements, and said Gateway Network Element and said subtended Network Elements being arranged for sending notifications to said Management System, the method comprising the steps of:
   a) determining the number of Network Elements that are subtended by the Gateway Network Element;
   b) calculating a Notification Throttling Threshold in dependence on a routing capacity of the Gateway Network Element and in dependence upon the number of Network Elements that are subtended by the Gateway Network Element; and
   c) assigning the Notification Throttling Threshold to the subtended Network Elements.

2. A method as claimed in claim 1, wherein in the step of calculating the Notification Throttling Threshold is defined as an upper limit for the rate at which a subtended Network Element may send notifications to the Management System without overloading the Gateway Network Element.

3. A method as claimed in claim 1, wherein steps a) to c) are repeated in the event that a change in the number of Network Elements that are subtended by the Gateway Network Element is detected.

4. A method as claimed in claim 1, wherein step b) comprises:
   determining the routing capacity of the Gateway Network Element;
   scaling the routing capacity of the Gateway Network Element by a factor corresponding to the fraction of the total routing capacity allocated to the transmission of notifications; and
   dividing the scaled routing capacity of the Gateway Network Element by the total number of Network Elements subtended from the Gateway Network Element to give the Notification Throttling Threshold.

5. A method as claimed in claim 1, wherein step b) comprises:
   determining the routing capacity of the Gateway Network Element;
   scaling the routing capacity of the Gateway Network Element by a factor corresponding to the fraction of the total routing capacity allocated to the transmission of notifications; and
   dividing the scaled routing capacity of the Gateway Network Element by a number comprising the combined number of Network Elements subtended from the Gateway Network Element, including the Gateway Network Element, to give the Notification Throttling Threshold.

6. A method as claimed in claim 4, wherein said factor corresponding to the fraction of the total routing capacity allocated to the transmission of notifications is user-programmable.

7. A method as claimed in claim 4, wherein at least step b) and step c) are repeated in the event that a change in the routing capacity of the Gateway Network Element is detected.

8. A method as claimed in claim 1, wherein said notifications are sent autonomously from the Gateway Network Element or a subtended Network Element in the event of a change of state of said Network Element.

9. A method as claimed in claim 7, wherein said notifications comprise Simple Network Management Protocol Traps.

10. A method as claimed in claim 1, wherein the telecommunications network comprises at least two Gateway Network Elements, and steps a) to c) are carried out for each Gateway Network Element.

11. A method as claimed in claim 1, wherein the method further comprises the steps of:
   d) monitoring the rate of transmission of notifications from the Gateway Network Element and subtended Network Elements; and
   e) at least partially ceasing transmission of notifications from a Gateway Network Element or subtended Network Element in the event that rate of transmission of notifications from said Network Element exceeds the Notification Throttling Threshold assigned to said Network Element.

12. A telecommunications network arranged for controlling a flow of notifications therein, said telecommunications network comprising:
   a Gateway Network Element arranged for subtending Network Elements;
   a Management System;
   a Network Analyser; and
   a Notification Threshold Manager,
   wherein:
   said Network Analyser is arranged for determining the number of Network Elements that are subtended by the Gateway Network Element;
   said Notification Threshold Manager is in communicative contact with said Network Analyser and is arranged for calculating a Notification Throttling Threshold in dependence on a routing capacity of the Gateway Network Element and in dependence upon the number of Network Elements that are subtended by the Gateway Network Element; and said Management System is in communicative contact with said Notification Threshold Manager and said Gateway Network Element, and is arranged for transmitting said Notification Throttling Threshold to said Gateway Network Element and Subtended Network Elements.

13. A network as claimed in claim 12, wherein said Notification Throttling Threshold is defined as an upper limit for the rate at which a subtended Network Element may send notifications to the Management System without overloading the Gateway Network Element.

14. A network as claimed in claim 12, wherein the Management System comprises a Network Manager.

15. A network as claimed in claim 12, wherein said notifications are sent autonomously from the Gateway Network Element or a subtended Network Element in the event of a change of state of said Network Element.

16. A network as claimed in claim 15, wherein said notifications comprise Simple Network Management Protocol Traps.

17. A network as claimed in claim 12, further comprising at least two Gateway Network Elements, said Network Analyser being arranged for determining the number of Network Elements subtended by each Gateway Network Element, said Notification Threshold Manager being arranged for calculating a Notification Throttling Threshold for each Gateway Network Element, and said Management System being arranged for transmitting a Notification Throttling Threshold for a given Gateway Network Element to said given Gateway Network Element and Subtended Network Elements subtended by said given Gateway Network Element.

18. An Operational Support System arranged for controlling a flow of notifications in a telecommunications network, said telecommunications network comprising a Gateway Network Element arranged for subtending Network Elements and a Network Analyser being arranged for determining the number of Network Elements that are subtended by the Gateway Network Element, said Operational Support System comprising:

a Management System; and
a Notification Threshold Manager,
wherein:

said Notification Threshold Manager is in communicative contact with the Network Analyser and arranged for calculating a Notification Throttling Threshold in dependence on a routing capacity of the Gateway Network Element and in dependence upon the number of Network Elements that are subtended by the Gateway Network Element; and said Management System is in communicative contact with said Notification Threshold Manager and said Gateway Network Element, and is arranged for transmitting said Notification Throttling Threshold to said Gateway Network Element and Subtended Network Elements.

* * * * *

UNITED STATES PATENT AND TRADEMARK OFFICE
CERTIFICATE OF CORRECTION

PATENT NO. : 9,954,721 B2  
APPLICATION NO. : 14/383095  
DATED : April 24, 2018  
INVENTOR(S) : Federico Pasini and Maurizio Pighetti Page 1 of 1

It is certified that error appears in the above-identified patent and that said Letters Patent is hereby corrected as shown below:

On the Title Page

After (54) METHOD AND SYSTEM FOR CONTROLLING FLOW OF NOTIFICATIONS WITHIN A TELECOMMUNICATIONS NETWORK  
Add --(71) Applicant: TELEFONAKTIEBOLAGET LM ERICSSON (PUBL), Stockholm (SE)--

Signed and Sealed this  
Thirty-first Day of July, 2018

Andrei Iancu  
*Director of the United States Patent and Trademark Office*